US006722448B2

(12) United States Patent
Ju

(10) Patent No.: US 6,722,448 B2
(45) Date of Patent: Apr. 20, 2004

(54) DRIVING TOOL HAVING AN IMPACTING DEVICE

(76) Inventor: Big Ju, P.O. Box 65-45, Taichung (TW), 403

( * ) Notice: Subject to any disclaimer, the term of this patent is extended or adjusted under 35 U.S.C. 154(b) by 0 days.

(21) Appl. No.: 10/301,470

(22) Filed: Nov. 19, 2002

(65) Prior Publication Data

US 2003/0121681 A1 Jul. 3, 2003

(30) Foreign Application Priority Data

Dec. 27, 2001 (TW) ..................................... 90224393 U

(51) Int. Cl.[7] ................................................ B23B 5/22

(52) U.S. Cl. ...................... 173/109; 173/93.5; 173/110; 173/97; 173/122; 81/63.1; 81/DIG. 2

(58) Field of Search ............................... 173/93.5, 109, 173/110, 97, 122; 81/DIG. 2, 60, 61, 62, 63, 63.1, 63.2

(56) References Cited

U.S. PATENT DOCUMENTS 2,521,816 A * 9/1950 Adams ........................ 74/127
2,580,607 A * 1/1952 Schmid ..................... 173/93.5
3,802,518 A * 4/1974 Albert ......................... 173/29
4,427,100 A * 1/1984 Rude et al. ................... 192/43
5,024,565 A * 6/1991 Pinand ....................... 408/121
6,202,760 B1 * 3/2001 Lin ............................ 173/109
6,568,693 B2 * 5/2003 Glass .......................... 279/80

OTHER PUBLICATIONS

Genco, Samuel A., Wire Nut Driver, Jun. 13, 2002, US 2002/0069715 A1.*

* cited by examiner

*Primary Examiner*—Rinaldi I. Rada
*Assistant Examiner*—Brian Nash

(57) ABSTRACT

A driving tool includes a block and an impactor received in a front and a rear chambers of a handle, a driving shank attached to the block, and a plunger engaged between the block and the impactor. The impactor includes a cavity formed in one end for selectively receiving the tip of the plunger and for impacting onto the plunger and the block and the driving shank when the tip of the plunger is aligned with and engaged into the cavity of the impactor. The block has a guide device for guiding the block and the driving shank to rotate relative to the handle.

13 Claims, 5 Drawing Sheets

DRIVING TOOL HAVING AN IMPACTING DEVICE

BACKGROUND OF THE INVENTION

1. Field of the Invention

The present invention relates to a driving tool, and more particularly to a driving tool having an impacting device for striking or impacting and rotating the driving tool.

2. Description of the Prior Art

Typical driving tools have been developed for driving fasteners, such as screws, bolts, or the like. When the screws or bolts have been rusted, a hammer device is required to be used to hammer and to loosen the screws or bolts, before the screws or bolts may be unthreaded by the driving tools.

Some of the typical impacting or hammering devices have been developed to apply impacting or hammering forces or operations against the screws or bolts. However, the typical impacting or hammering devices may not be used to rotate or to drive the screws or bolts.

The present invention has arisen to mitigate and/or obviate the afore-described disadvantages of the conventional driving tools.

SUMMARY OF THE INVENTION

The primary objective of the present invention is to provide a driving tool including an impacting device for striking or impacting and rotating the driving tool, in order to drive the rusted or damaged fasteners.

In accordance with one aspect of the invention, there is provided a driving tool comprising a handle including a front chamber and a rear chamber formed therein, and a partition provided between the front chamber and the rear chamber of the handle, the partition including a passage formed therein, a block slidably and rotatably received in the front chamber of the handle, a driving shank attached to the block, a plunger slidably received in the passage of the partition, and including a first end engageable with the block, and a second end having a tip provided thereon, an impactor slidably received in the rear chamber of the handle, and including a first end having a cavity formed therein for selectively receiving the tip of the plunger, means for aligning the tip of the plunger with the cavity of the impactor, a first biasing means for biasing the impactor toward the partition, the first biasing means biasing and forcing the impactor onto the plunger and the block when the tip of the plunger is aligned with and engaged into the cavity of the impactor, and means for guiding the block to rotate relative to the handle.

The guiding means includes at least one passageway formed in the block, and includes at least one ball slidably received in the handle and engageable into the front chamber thereof and slidably received in the passageway of the block.

The passage of the block includes a front end and a rear end, the guiding means further includes at least one inclined pathway formed in the block and having one end communicating with the front end of the passage of the block.

A barrel is further provided and rotatably received between the driving shank and the block, and including at least one inclined surface to selectively align with the the passageway of the block, and to guide the ball to slide along the inclined surface of the barrel.

The barrel includes a peripheral swelling extended radially and outwardly from a front portion thereof and having the inclined surface formed therein.

A device may further be provided for positioning the barrel to the block.

Another device may further be provided for locking the block to the handle, and includes at least one recess formed in the handle, at least one ball slidably received in the block and engageable into the recess of the handle, and means for forcing the ball of the block to engage into the recess of the handle.

The barrel includes a jut provided thereon for engaging with and for forcing the ball of the block to engage into the recess of the handle. The barrel includes at least one depression formed therein for receiving the ball, and for disengaging the ball from the the recess of the handle.

Another spring biasing device may further be provided for biasing the plunger against the block.

The plunger includes a segment arranged close to the tip of the plunger and having an outer diameter smaller than that of the plunger and smaller than an inner diameter of the passage of the partition, to allow the plunger to be tilted relative to handle when the segment of the plunger is received in the passage of the partition. For example, the segment of the plunger may be inclined from the plunger toward the tip of the plunger.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
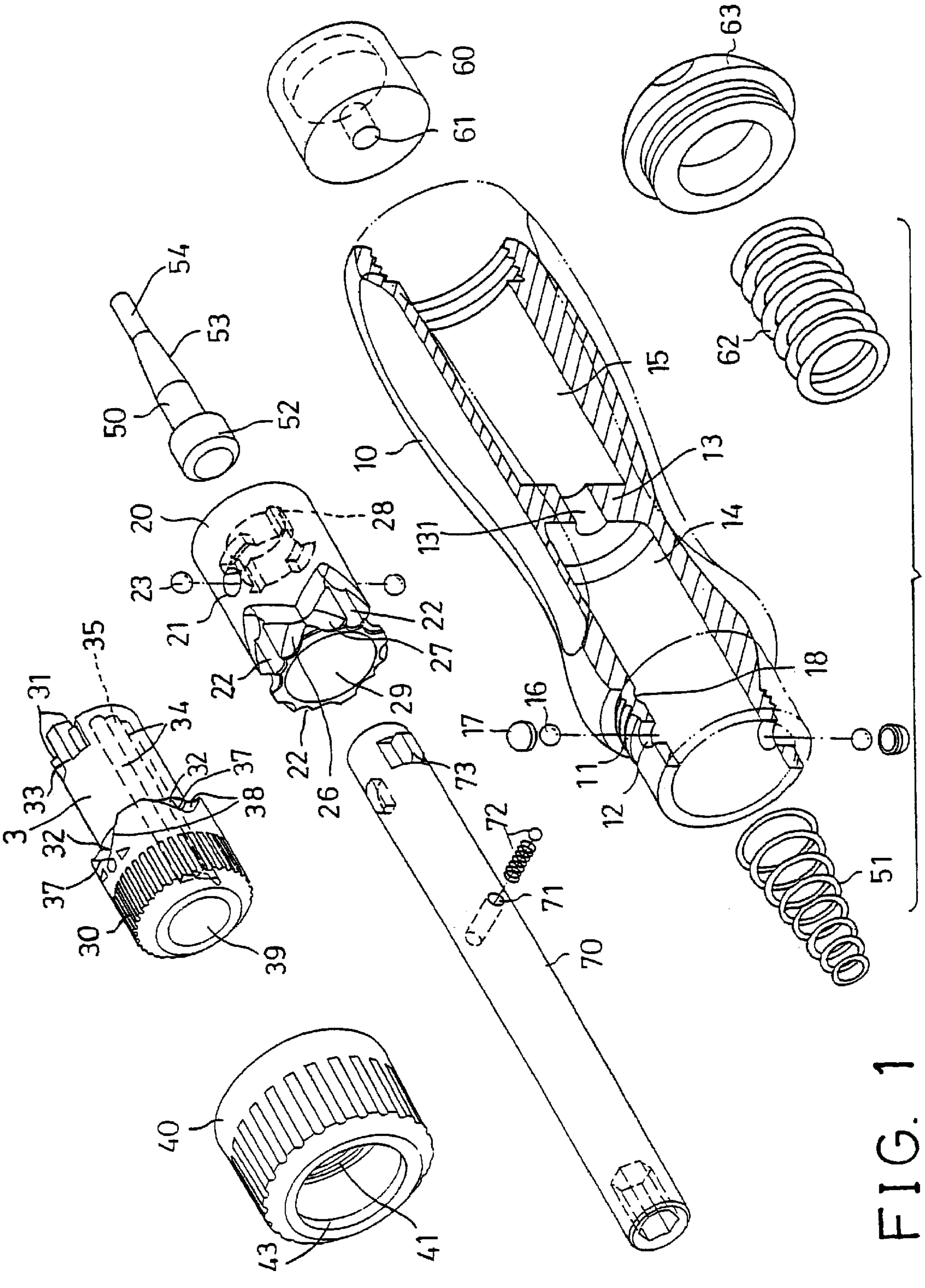
FIG. 1 is an exploded view of a driving tool in accordance with the present invention.
Figure 2:
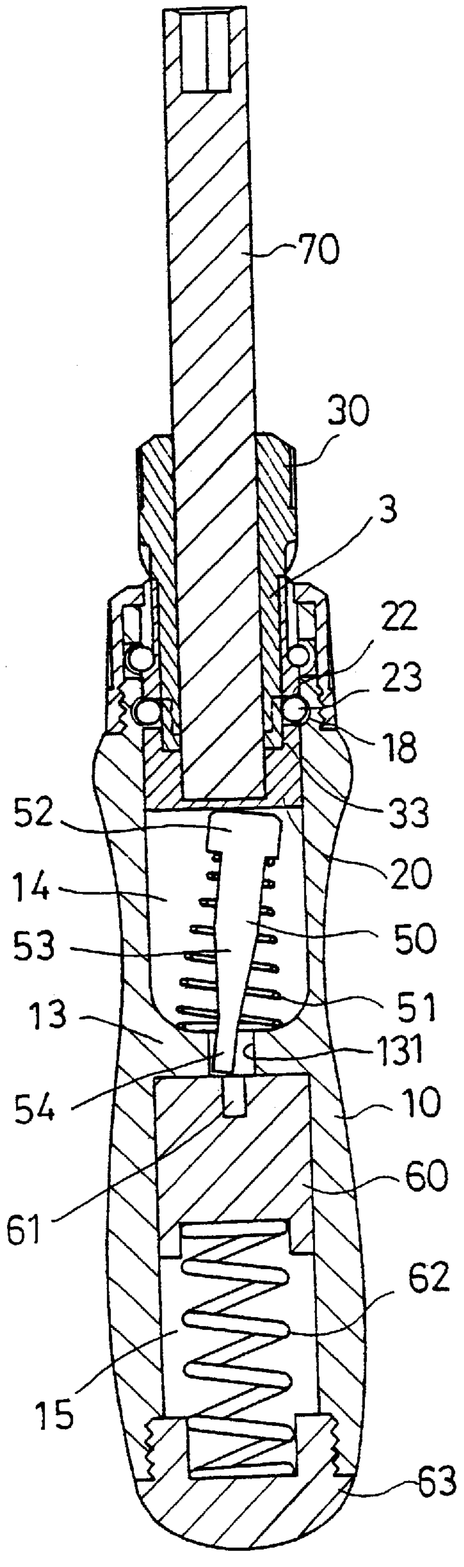
FIG. 2 is a cross sectional view of the driving tool.

Referring to the drawings, and initially to FIGS. 1 and 2, a driving tool in accordance with the present invention comprises a housing or a handle 10 including a hollow interior, and including a partition 13 extended or provided in the middle portion of the hollow interior of the handle 10, for separating the hollow interior of the handle 10 into a front or first and a rear or second chambers 14, 15 therein. The partition 13 includes a passage 131 formed therein.

The handle 10 includes an outer thread 11 formed in the front portion thereof, for threading with an inner thread 41 of a cover 40 which may thus be threaded or detachably secured to the front portion of the handle 10. The cover 40 includes a bore 43 formed therein, such as formed in the front portion thereof and having an inner diameter smaller than that of the front chamber 14 of the handle 10.

The handle 10 further includes one or more, such as two opposite apertures 12 formed in the front portion thereof and communicating with the front chamber 14 thereof, each for slidably receiving a ball 16 therein, and each being blocked or enclosed or sealed with a lid 17 that is secured to the handle 10 with such as a forging or welding operation. The handle 10 further includes one or more, such as two opposite inner recesses 18 formed therein.

An impactor 60 is slidably received in the rear chamber 15 of the handle 10. A spring 62 is also received in the rear chamber 15 of the handle 10, and engaged with the impactor 60, for biasing the impactor 60 toward and to engage with the partition 13 of the handle 10 (FIGS. 2, 3), or to impact onto the partition 13.

A cap 63 is secured to the rear portion of the handle 10, by such as a threaded engagement, for retaining the impactor 60 and the spring 62 within the rear chamber 15 of the handle 10. The impactor 60 includes a cavity 61 formed therein and facing toward the partition 13, and preferably aligned with the passage 131 of the partition 13, and having an inner diameter smaller than that of the passage 131 of the partition 13.

A plunger 50 is slidably engaged in the passage 131 of the partition 13, and includes an enlarged head 52 formed and provided on one end thereof and slidably received in the front chamber 14 of the handle 10, and includes an inclined segment 53 and a tip 54 formed or provided on the other end thereof and slidably received in the rear chamber 15 of the handle 10.

The tip 54 includes a diameter smaller than that of the plunger 50. The inclined segment 53 is provided or formed between the plunger 50 and the tip 54, and has a diameter gradually reduced from the plunger 50 side or end toward the tip 54 side or end, such that the inclined segment 53 includes a substantially frustum-shaped structure.

The tip 54 of the plunger 50 is provided for engaging with and for forcing the impactor 60 against the spring 62 (FIGS. 2–4), and thus for moving the impactor 60 away from the partition 13 or toward the cap 63. In addition, the tip 54 of the plunger 50 may also be provided for engaging into the cavity 61 of the impactor 60 (FIG. 5), when the tip 54 of the plunger 50 is aligned with the cavity 61 of the impactor 60.

The passage 131 of the partition 13 includes an inner diameter equal to or slightly greater than that of the plunger 50, for snugly receiving the plunger 50 (FIG. 5), and for erecting or centering the plunger 50, and for aligning the plunger 50 with or along the longitudinal direction of the handle 10, and thus for aligning the tip 54 of the plunger 50 with the cavity 61 of the impactor 60, and for allowing the tip 54 of the plunger 50 to be engaged into the cavity 61 of the impactor 60.

Another spring 51 is engaged between the partition 13 and the head 52 of the plunger 50, for biasing the tip 54 of the plunger 50 in a direction away from the impactor 60 and the cap 63, or for biasing the tip 54 of the plunger 50 toward the partition 13, or for biasing and disengaging the tip 54 of the plunger 50 away from the cavity 61 of the impactor 60. The spring 51 may thus be used as a device to disengage the tip 54 of the plunger 50 away from the cavity 61 of the impactor 60. The engagement of the plunger 50 in the passage 131 of the partition 13 may be used as a device to align the plunger 50 with the longitudinal axis of the handle or to align the tip 54 of the plunger 50 with the cavity 61 of the impactor 60.

The inclined segment 53 and the tip 54 of the plunger 50 includes an outer diameter smaller than that of the passage 131 of the partition 13, such that the plunger 50 may be arranged to be tilted or inclined relative to the handle 10 by the spring 51, for offsetting the tip 54 of the plunger 50 from the cavity 61 of the impactor 60 (FIGS. 2, 3, 4) when the inclined segment 53 and the tip 54 of plunger 50 are slidably received in the passage 131 of the partition 13.

Figure 3:
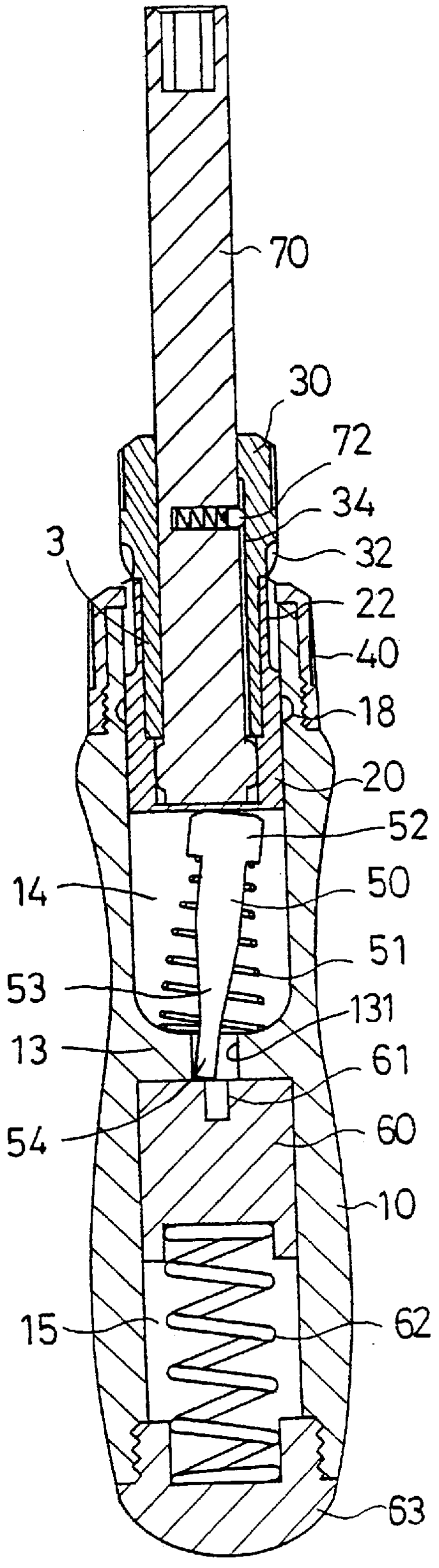
FIGS. 3, 4, 5 are cross sectional views similar to FIG. 2, illustrating the operation of the driving tool.
Figure 4:
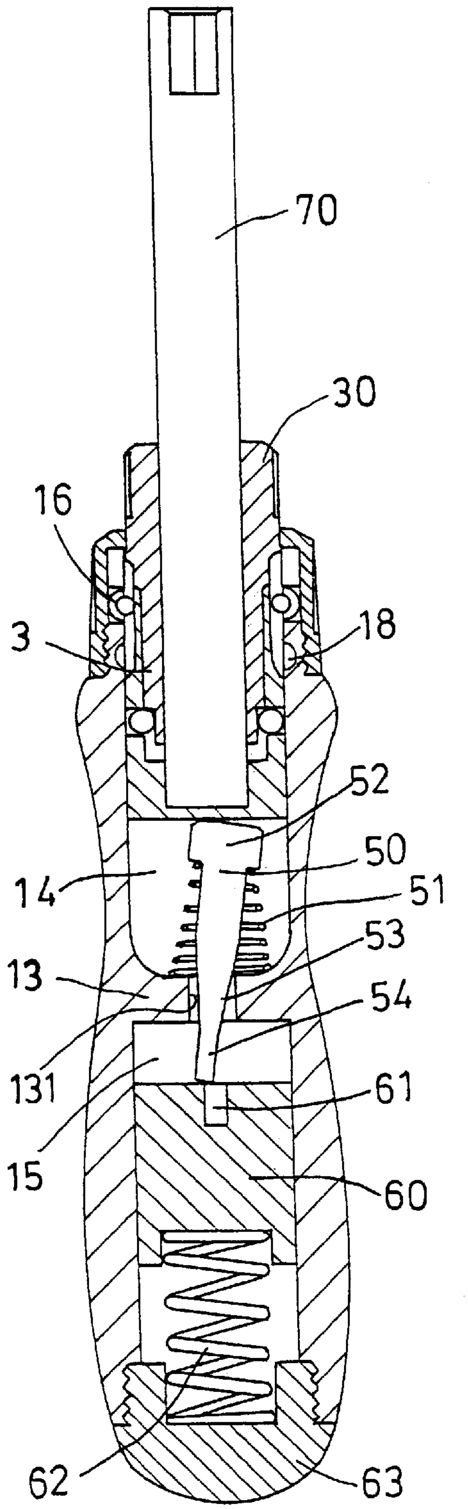
Figure 5:
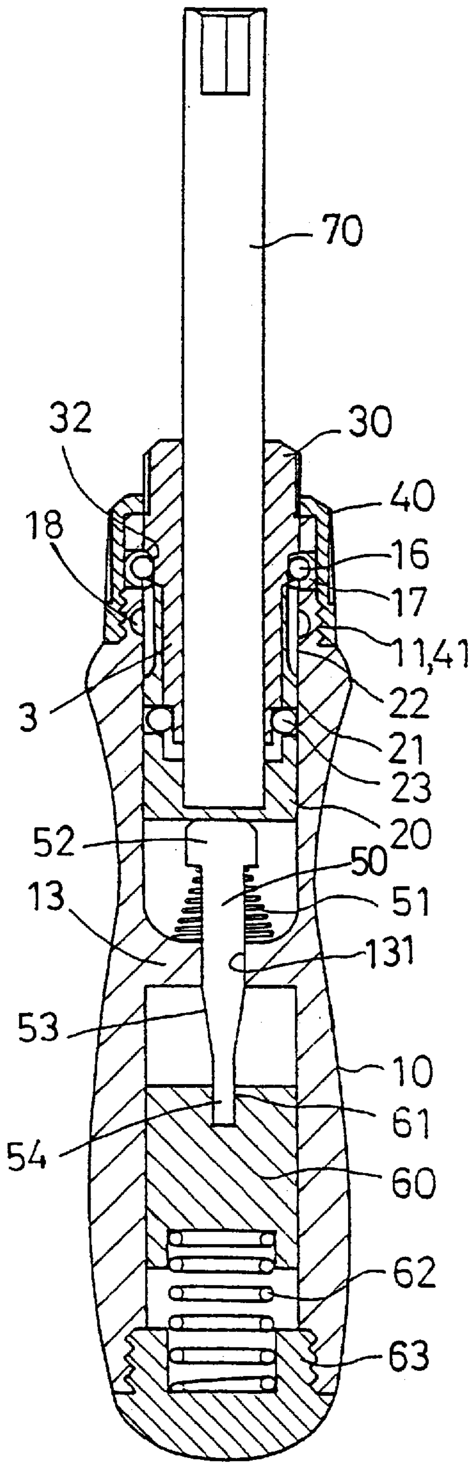

As also shown in FIGS. 2–4, when the tip 54 of the plunger 50 is offset from the cavity 61 of the impactor 60, the impactor 60 may then be moved and forced away from the partition 13, by the plunger 50, against the spring 62. The impactor 60 may be biased to impact onto the plunger 50 when the tip 54 of the plunger 50 is aligned with and engaged into the cavity 61 of the impactor 60, from the position as shown in FIG. 4 toward the position as shown in FIG. 5.

An impact receiver or a block 20 is slidably received in the front chamber 14 of the handle 10, and includes an opening 29 formed therein (FIG. 1) for receiving one end of a driving shank 70, and includes a rear portion contactable or engageable with the head 52 of the plunger 50 (FIGS. 2–5), for receiving or for being subjected to the impact from the plunger 50 by the impactor 60.

The block 20 includes one or more depressions 28 formed therein and communicating with the opening 29 thereof, for receiving one or more nips 73 of the driving shank 70, and for preventing the driving shank 70 from rotating relative to the block 20. The block 20 includes one or more, such as two opposite orifices 21 laterally formed therein and communicating with the opening 29 thereof, for slidably receiving balls 23 therein respectively.

A barrel 3 is rotatably and slidably received in the opening 29 of the block 20, and engaged between the driving shank 70 and the block 20, and includes an enlarged peripheral swelling 30 extended radially and outwardly from the front portion of the barrel 3. It is preferable that the swelling 30 of the barrel 3 includes an outer diameter equals to or slightly smaller than that of the block 20, for allowing the swelling 30 to be slidably engaged in and out through the bore 43 of the cover 40 (FIGS. 2–8).

The barrel 3 includes one or more, such as two pairs of depressions 31 formed therein, such as formed in the rear portion thereof for selectively receiving the respective balls 23 of the block 20 therein, and for allowing the ball 23 to be disengaged from the recesses 18 of the handle 10 (FIGS. 3–5), and includes a jut 33 extended or provided between the depressions 31 thereof, for engaging with the ball 23, and for forcing the ball 23 outwardly to engage into the recesses 18 of the handle 10 (FIG. 2), and for locking the barrel 3 and the block 20 to the handle 10.

The barrel 3 includes two side longitudinal grooves 34, and an intermediate longitudinal groove 35 formed in the inner portion thereof. The driving shank 70 includes an aperture 71 laterally formed therein for receiving a spring-biased projection 72 which is biased to engage with either of the longitudinal grooves 34, 35 of the barrel 3, for positioning the driving shank 70 and the block 20 to the barrel 3.

For example, when the spring-biased projection 72 of the driving shank 70 is biased to engage with the intermediate longitudinal groove 35 of the barrel 3, the jut 33 of the barrel 3 may be maintained or retained in the engagement with the ball 23, such that, at this moment, the driving shank 70 and the block 20 to the barrel 3 may be locked to the handle 10 and may not be rotated relative tot he handle 10.

When the spring-biased projection 72 of the driving shank 70 is biased to engage with either of the side longitudinal grooves 34 of the barrel 3, the ball 23 may be maintained and received in either of the depressions 31 of the barrel 3, such that, at this moment, the ball 23 may be disengaged from the recesses 18 of the handle 10 (FIGS. 3–5), and such that the barrel 3 and the block 20 and the driving shank 70 may be rotated and slid relative to the handle 10.

The block 20 further includes one or more, such as four passageways 22 formed in the front and outer peripheral portion thereof, and parallel to the longitudinal axis of the block 20, for slidably receiving the balls 16 of the handle 10;

and includes one or more pairs, such as four pairs of inclined or cross-shaped pathways 26, 27 formed or provided between every two adjacent passageways 22, and having ends communicating with ends of the passageways 22, best shown in FIGS. 1 and 6–8.

The barrel 3 includes one or more, such as four notches 32 formed therein, such as formed in the rear portion of the peripheral swelling 30 thereof, for aligning with the respective passageways 22 of the block 20. The barrel 3 includes four pairs of inclined surfaces 37, 38 formed therein for forming or defining the notches 32 thereof, and for aligning with the passageways 22 of the block 20 respectively (FIGS. 6–8).

Figure 6:
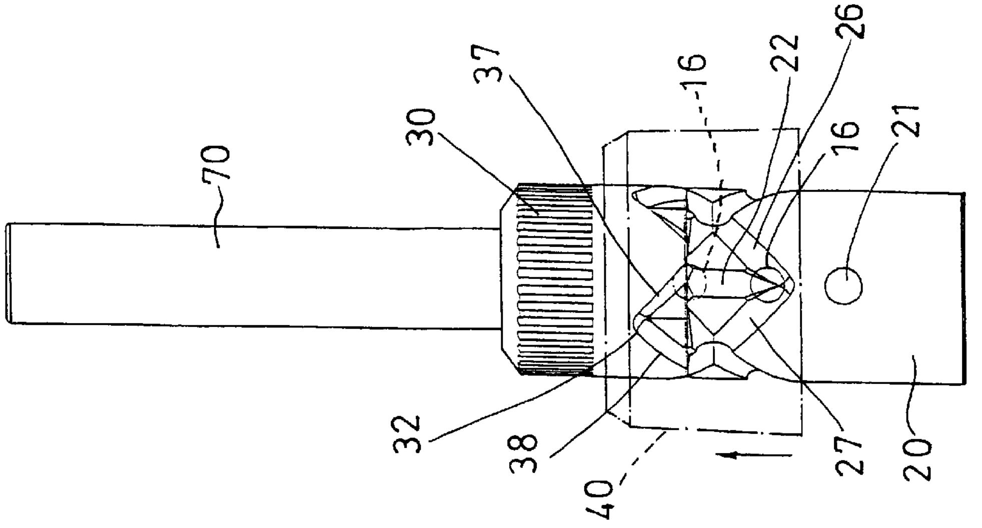
FIGS. 6, 7, 8 are plan schematic views illustrating the operation of the driving tool.
Figure 7:
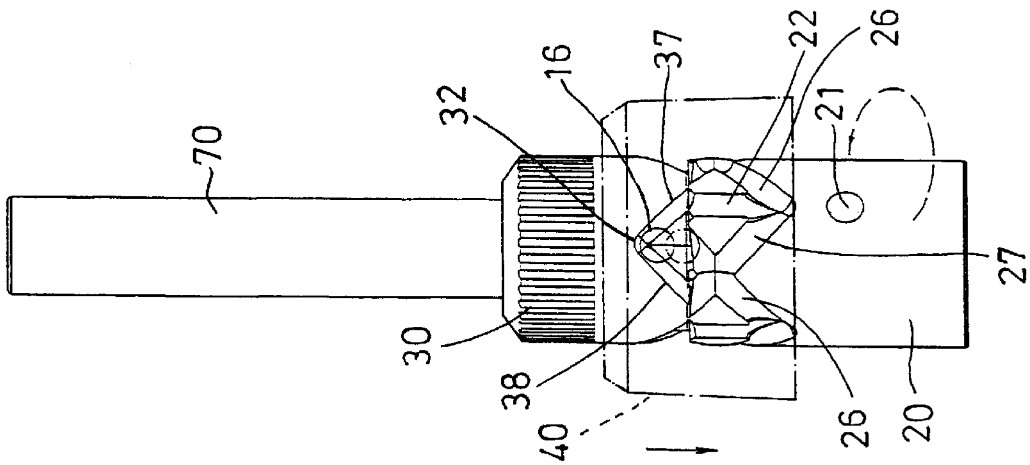
Figure 8:
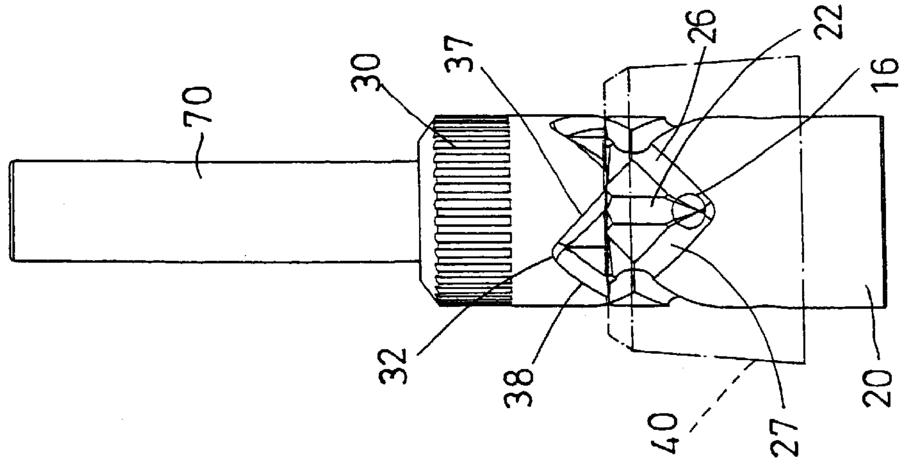

For example, the peripheral swelling 30 of the barrel 3 may be rotated relative to the block 20, in order to align the inclined surface 37 thereof with the passageways 22 of the block 20 respectively, as shown in FIGS. 6–8). At this moment, the spring-biased projection 72 of the driving shank 70 may be biased to engage with one of the side longitudinal grooves 34 of the barrel 3, in order to maintain or to lock the barrel 3 to the block 20 at the required position.

In operation, as shown in FIG. 3, the block 20 and thus the barrel 3 and the driving shank 70 may be biased outwardly relative to the handle 10 and the cover 40 by the springs 62, 51. The barrel 3 may be rotated relative to the block 20, to have the balls 23 received in the depressions 31 of the barrel 3, for allowing the barrel 3 and the block 20 to be slid and rotated relative to the handle 10, and for aligning the inclined surfaces 37 of the barrel 3, for example, with the passageways 22 of the block 20 respectively.

As shown in FIG. 8, when the inclined surfaces 37 of the barrel 3 are aligned with the passageways 22 of the block 20 respectively, the peripheral swelling 30 of the barrel 3 may be biased and moved outwardly of the cover 40, and the balls 16 of the handle 10 may be aligned and engaged in the root portions of the passageways 22 respectively. A selective tool bit (not shown) may be engaged into the free end of the driving shank 70, for being rotated or driven by the driving shank 70 to drive fasteners (not shown).

When the user holds the handle 10 and engages or forces the driving shank 70 against the fasteners, the barrel 3 and the block 20 and the driving shank 70 may be forced into the handle 10 and the cover 40 against the springs 62, 51, and the ball 16 may be moved along the passageway 22 from one end of the passageway 22 of the block 20 as shown in solid line in FIG. 6 to the other end of the passageway 22 as shown in dotted lines in FIG. 6, and may be forced to engage with the inclined surface 37 of the barrel 3.

At this moment, the plunger 50 may be tilted relative to the handle 10 by the spring 51 (FIG. 4), for allowing the impactor 60 to be moved relative to the handle 10, against the spring 62, by the block 20 and the barrel 3 and the driving shank 70. Further at this moment, the inclined segment 53 of plunger 50 is slidably received in the passage 131 of the partition 13, and the tip 54 of the plunger 50 is disengaged from the cavity 61 of the impactor 60.

When the driving shank 70 is further forced against the fasteners, and when the barrel 3 and the block 20 further move into the cover 40, as shown in FIG. 7, the ball. 16 may be guided to move along the inclined surface 37 of the barrel 3. However, the ball 16 is positioned to the handle 10 and thus to the cover 40 and the handle 10 is held by the user, such that the cover 40 and the handle 10 will not be rotated relative to the user, and such that the block 20 and the barrel 3 may be forced to be rotated relative to the handle 10 and the cover 40, from the position as shown in FIG. 6 to the position as shown in FIG. 7, when the ball 16 is guided to move along the inclined surface 37 of the barrel 3.

When the ball 16 is guided to move toward the coupling portion of the inclined surfaces 37, 38 of the barrel 3, as shown in solid lines in FIG. 7, the plunger 50 may be arranged to be engaged into the passage 131 of the partition 13, and the tip 54 of the plunger 50 may be caused to be aligned and engaged into the cavity 61 of the impactor 60. At this moment, the impactor 60 may be forced to strike or to impact onto the plunger 50 which may then strike or impact onto the block 20 and the barrel 3 and the driving shank 70, in order to impact or hit or strike onto the fasteners.

At this moment, the ball 16 may be forced to move along the inclined pathway 26 of the block 20, as shown in dotted lines in FIG. 7, until the ball 16 is aligned with the other passageway 22 of the block 22, or in the position as shown in FIG. 8 again, such that the block 20 and the barrel 3 and thus the driving shank 70 may further be caused to be rotated relative to the cover 40 and the handle 10.

The driving shank 70 may thus be forced against the fasteners again, and the block 20 and the barrel 3 and the driving shank 70 may be impacted or hit or stricken again onto the fasteners when the impactor 60 strike onto the plunger 50 again. Accordingly, the fasteners, particularly the rusted or damaged fasteners may be impacted and rotated by the driving shank 70 and the impactor 60 again and again, by forcing the driving shank 70 onto the fastener again and again.

On the contrary, when the spring-biased projection 72 of the driving shank 70 is biased to engage with another side longitudinal groove 34 of the barrel 3, the other inclined surface 38 of the barrel 3 may be arranged to be aligned with the passageways 22 of the block 20 respectively, for guiding the ball 16 to move toward the other direction, or for rotating the block 20 and the barrel 3 in the other direction relative to the handle 10 and the cover 40.

It is to be noted that the formation or the provision of the passages 22 and the cross-shaped pathways 26, 27 in the block 20, and the provision of the notches 32 in the barrel 3 may be used as a guiding device to guide the rotational movement of the block 20 and the barrel 3 relative to the handle 10 and the cover 40, and thus to control the driving direction against the fasteners.

In addition, the rotational movement of the inclined surfaces 37, 38 of the barrel 3 relative to the passages 22 and the cross-shaped pathways 26, 27 in the block 20, may be used to adjust the movement of the balls 16 relative to the pathways 26, 27 of the block 20, and thus to adjust the driving directions of the driving shank 70 to the fasteners.

Figure 9:
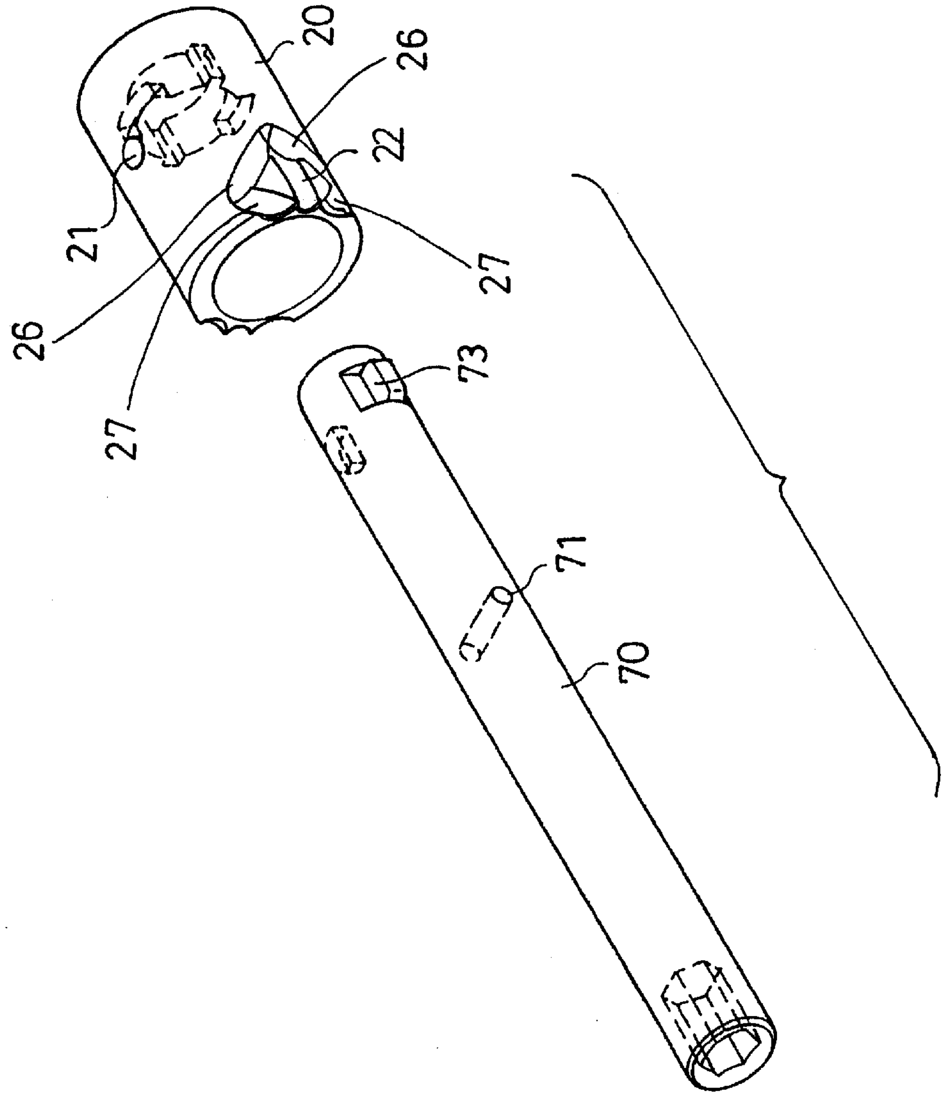
FIG. 9 is a partial exploded view illustrating the other arrangement of the driving tool.

Alternatively, as shown in FIG. 9, the block 20 may include one or more, such as two opposite passageways 22 formed therein, and two pairs of C-shaped pathways 26, 27 formed therein for slidably receiving the ball 16 and for guiding the ball 16 to move relative to the block 20.

Accordingly, the driving tool in accordance with the present invention includes an impacting device for striking or impacting and rotating the driving tool, in order to drive the rusted or damaged fasteners.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A driving tool comprising:

a handle including a front chamber and a rear chamber formed therein, and a partition provided between said front chamber and said rear chamber of said handle, said partition including a passage formed therein, a block slidably and rotatably received in said front chamber of said handle, a driving shank attached to said block, a plunger slidably received in said passage of said partition, and including a first end engageable with said block, and a second end having a tip provided thereon, an impactor slidably received in said rear chamber of said handle, and including a first end having a cavity formed therein for selectively receiving said tip of said plunger, means for aligning said tip of said plunger with said cavity of said impactor, a first biasing means for biasing said impactor toward said partition, said first biasing means biasing and forcing said impactor onto said plunger and said block when said tip of said plunger is aligned with and engaged into said cavity of said impactor, and means for guiding said block to rotate relative to said handle.

2. The driving tool according to claim 1, wherein said guiding means includes at least one passageway formed in said block, and includes at least one ball slidably received in said handle and engageable into said front chamber thereof and slidably received in said at least one passageway of said block.

3. The driving tool according to claim 2, wherein said at least one passage of said block includes a front end and a rear end, said guiding means further includes at least one inclined pathway formed in said block and having one end communicating with said front end of said at least one passage of said block.

4. The driving tool according to claim 2 further comprising a barrel rotatably received between said driving shank and said block, and including at least one inclined surface to selectively align with said said at least one passageway of said block, and to guide said at least one ball to slide along said at least one inclined surface of said barrel.

5. The driving tool according to claim 4, wherein said barrel includes a peripheral swelling extended radially and outwardly from a front portion thereof and having said at least one inclined surface formed therein.

6. The driving tool according to claim 4 further comprising means for positioning said barrel to said block.

7. The driving tool according to claim 1 further comprising means for locking said block to said handle.

8. The driving tool according to claim 7, wherein said locking means includes at least one recess formed in said handle, at least one ball slidably received in said block and engageable into said at least one recess of said handle, and means for forcing said at least one ball of said block to engage into said at least one recess of said handle.

9. The driving tool according to claim 8, wherein said forcing means includes a barrel rotatably received between said driving shank and said block, and having a jut provided thereon for engaging with and for forcing said at least one ball of said block to engage into said at least one recess of said handle.

10. The driving tool according to claim 9, wherein said barrel includes at least one depression formed therein for receiving said at least one ball, and for disengaging said at least one ball from said said at least one recess of said handle.

11. The driving tool according to claim 1 further comprising a second biasing means for biasing said plunger against said block.

12. The driving tool according to claim 1, wherein said plunger includes a segment arranged close to said tip of said plunger and having an outer diameter smaller than that of said plunger and smaller than an inner diameter of said passage of said partition, to allow said plunger to be tilted relative to handle when said segment of said plunger is received in said passage of said partition.

13. The driving tool according to claim 12, wherein said segment of said plunger is inclined from said plunger toward said tip of said plunger.

* * * * *